Aug. 2, 1960

D. D. GUTIERREZ 2,947,336

TRACTION DEVICE

Filed Feb. 26, 1959

INVENTOR.
DONALD D. GUTIERREZ

BY W. A. Murray

ATTORNEY

INVENTOR.
DONALD D. GUTIERREZ

2,947,336
TRACTION DEVICE

Donald D. Gutierrez, 444 Railroad Ave., Moline, Ill.

Filed Feb. 26, 1959, Ser. No. 795,646

14 Claims. (Cl. 152—216)

This invention relates to attachable and detachable shoe elements associated with a wheel assembly on a vehicle for the purpose of increasing the traction on the wheel when the latter moves through snow, mud, or soft earth which normally causes the vehicle to become mired down or generally "stuck" against movement.

The conventional type of equipment now used for such purpose in snow is chains which fit peripherally about the tire and wheel and generally add traction to the wheel. However, the chains must be placed on the wheel after the snow arrives, and should be removed before the snow is completely removed from the streets. The latter should be done in order to preserve the life of the chains, since chains will fail quickly if driven over bare streets. Consequently, the labor involved in placing and removing the chains may be considerable over a season, and, of course, there is excellent possibility of not having the chains on the wheels when they are most needed. Also, the use of chains does not take into consideration the requirements of increased traction when traveling through mud, sand or other types of soft earth.

It is therefore the primary object of this invention to provide shoes for use on a wheel assembly which may be moved into and out of engagement with the periphery of the wheel, and when not in engagement with the wheel will remain mounted on the vehicle frame.

A second main object of this invention is to provide control means with the wheel means which is controlled internally of the car and which operates to move the shoes into engagement with the wheel or out of engagement, whichever is desired.

A still further object of this invention is to use the electrical power source of the vehicle to operate solenoids in the aforesaid control means which will basically effect movement of the shoes in and out of contact with the wheel means.

Other objects and advantages of the invention will become apparent to those skilled in the art as the nature of the invention is better understood from the following description and as shown in the accompanying drawings.

Figure 1:
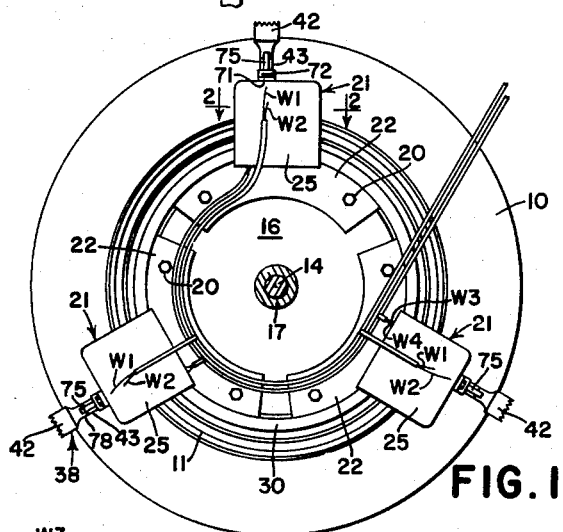
Fig. 1 is a vertical sectional view taken through the axle of a wheel assembly and looking at the inner side of the wheel.

Referring now to Fig. 1, the wheel structure includes a tire member 10 of the tubeless variety or similar type of torus member mounted on a wheel rim 11 which in turn is bolted, as at 12, to a brake drum 13 in conventional manner. The brake drum 13 is fixed to an axle 14 and rotates with the wheel structure. Closing the inner side of the brake drum is a wall or plate 16 fixed to the axle housing 17 so as to be held against rotation. The wheel structure is of conventional form and is therefore set forth only generally, the wheel itself serving as no part of this invention.

Figure 4:
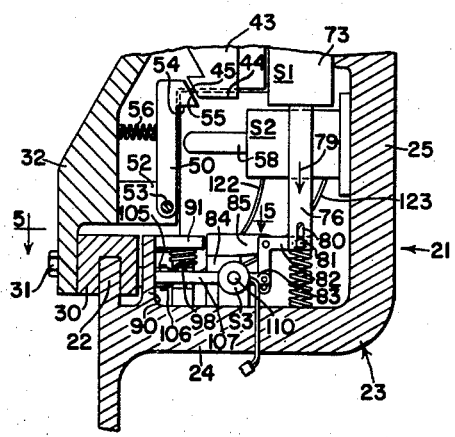
Fig. 4 is a sectional view taken substantially along the line 4—4 of Fig. 2.
Figure 2:
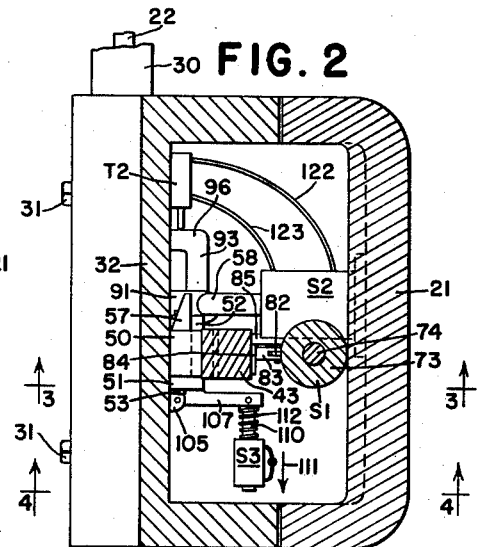
Fig. 2 is an enlarged sectional view taken substantially along the line 2—2 of Fig. 1.
Figure 5:
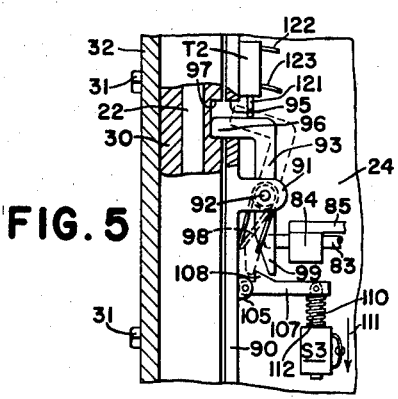
Fig. 5 is a sectional view taken substantially along the line 5—5 of Fig. 4.

Mounted on the plate 16 by bolts 20 are three angularly spaced frames or supports 21, each having an annular guide portion 22 and a radially extending support portion 23. The portion 23 is formed of an axially extending section 24, and a radially extending section 25 extending from the end of the section 24, the sections 24, 25 forming an L as indicated in Fig. 2. The guide portions 22 are placed angularly around the plate 16 so as to form a substantially round guide or ring concentric with the axis of the axle 14. There are obvious gaps between the members 21 and particularly between the sections of the guide rings 22. Such gaps permit the members 21 to be placed on the wall 16 without dismantling the wheel or even removing the wheel from the vehicle while retaining a substantially complete annular guide or ring.

Fitting over the sections 22 forming the guide ring is an annular track 30 of U-shape cross section with opposite leg portions of the U section fitting in sliding engagement with and on opposite sides of the guide sections 22. Fixed by bolts 31 to the outer leg of the track 30 are three radially extending shoe support brackets 32 angularly spaced on the order of the members 21. The radial outer end of the support 32 has a boss section 33 with an opening 34 therein through which a shank portion 43 of a shoe 38 may move. Each boss 33 is provided with a cap 36 bolted at 37 thereto. The boss 33 is provided with an enlarged hollow section 40, somewhat larger than the shank 43 in which is seated a spring 39. The cap 36 closes the upper end of the enlarged opening 40.

Each shoe 38 is composed of an axially extending shoe portion 42 overlying the tire 10 and the previous mentioned radial portion 43 extending alongside the tire 10. The shank portion 43 extends through the hollow center of the boss portion 33, the cap 36 also being provided with a central opening to accommodate radial movement of the shank 43. Integral with the shank 43 is a collar 46 which lies inwardly of and adjacent to the cap 36. The spring 39 acts against the collar 46 and biases the shoe 38 radially outwardly to a position in which the shoe portion 42 is spacedly outward of the tire 10. The radial inner end of the shank 43 is provided with a hook 44 which is disposed inwardly of the boss 33. An inclined surface 45 is provided at the lower end of the shank portion 43.

Shoe locking means are provided which will lock the shoes 38 in a first position of engagement with the wheel and comprise an L-shaped lever 50 pivotally mounted between a pair of supports 51, 52 which are integral with and extend axially inwardly of the main shoe support bracket 32. A pin 53 serves as the pivoting point of the lever 50. The upper end of the L-shaped lever 50 is provided with an axially extending portion 54 which hooks over the lower hooked end 44 of the shank 43. The adjacent surfaces of the shank end 44 and portion 54 are inclined at 45, 55 respectively. The lever 50 is backed by a spring 56 which biases the locking lever 50 into its locked position. Consequently, as shank 34 moves inwardly it will drive the lever 50 against the pressure of the spring 56. The lever 50 is also provided with a lug 57 (Fig. 2) which engages the plunger 58 of a secondary solenoid S2 fixed to the inner surface of the support 21. In operation, therefore, the shoe 38, upon being brought to a first position of engagement with the tire, as shown in dotted representation in Fig.

3, will have the lower end 44 of its shank move under the portion 54 of the locking lever 50. The spring 56 will maintain the lever 50 in its locked position. Upon energizing the solenoid S2, the plunger 58 will drive the lock out of engagement with the portion 44 and the spring 39 will operate to drive the shoe 38 to a second position spacedly outward of the tire 10.

A primary solenoid, indicated in its entirety by the reference character S1, is also supported on the radial support portion or frame 25, a lug 71 being provided on the solenoid S1 to receive a bolt 72 which fixes the solenoid S1 to the support portion 25. The solenoid S1 includes a cylindrical energizing part 73 and a plunger 74 having opposite ends 75, 76 extending beyond the part 73.

The end 75 of the plunger is hooked at 77 to overlie a lug 78 on the shoe 38. The primary solenoid S1 when energized will move radially inwardly as indicated by the arrow 79. Consequently, the solenoid S1 operates as means effecting radial movement of the shoe 38 from its second position away from the tire 10 to its first position in engagement with the tire.

The lower end 76 of the plunger 74 is provided with a slot 80 through which a pin 81 extends and connects the end 76 to one leg of a bell crank lever 82. The opposite leg of the bell crank 82 is connected to a push rod 83 disposed axially and above the support portion 24. A guide 84 is provided for the rod 83 and has an inwardly extending ear 85 which serves as support for the bell crank 82. The guide 84 may be fixed in any suitable manner to the support portions 24 or may be cast as an integral part of the portion 24.

At this time it should be recognized that when the shoes 38 are in engagement with the tire 10, the track 30 must be free to rotate on the guides 22. However, upon the shoes moving to their second position away from the tire, it is required that the track 30 be prevented from rotating relative to the guide 22 or the entire frame or support 21. Also, it is obvious that when the shoes are in their second position they must be correctly positioned angularly so that they will be clear of the ground. Therefore, it is necessary to provide locking and positioning means between the support 21 and the guide 22. Such locking means will presently be described.

Extending radially outwardly from the support 24 and positioned adjacent to the axially inner leg of the track 30 is a wall 90. The wall 90 has a lug 91 extending axially inwardly, the latter serving as a support for a pivot pin 92. An L-shaped guide locking element 93 is mounted on the pin 92. Suitable spacers are also mounted on the pin 92 and maintain the locking element 93 substantially midway between the lug 91 and support portion 24. Cut in the wall 90 is a slot 95 which receives one leg 96 of the element 93. Provided in the track 30 is a slot 97 which may register with the slot 95 and, of course, also receive the leg 96. A torsion spring 98 is provided about the pivot pin 92 to bias the leg 96 into the slots 95, 97.

Figure 3:
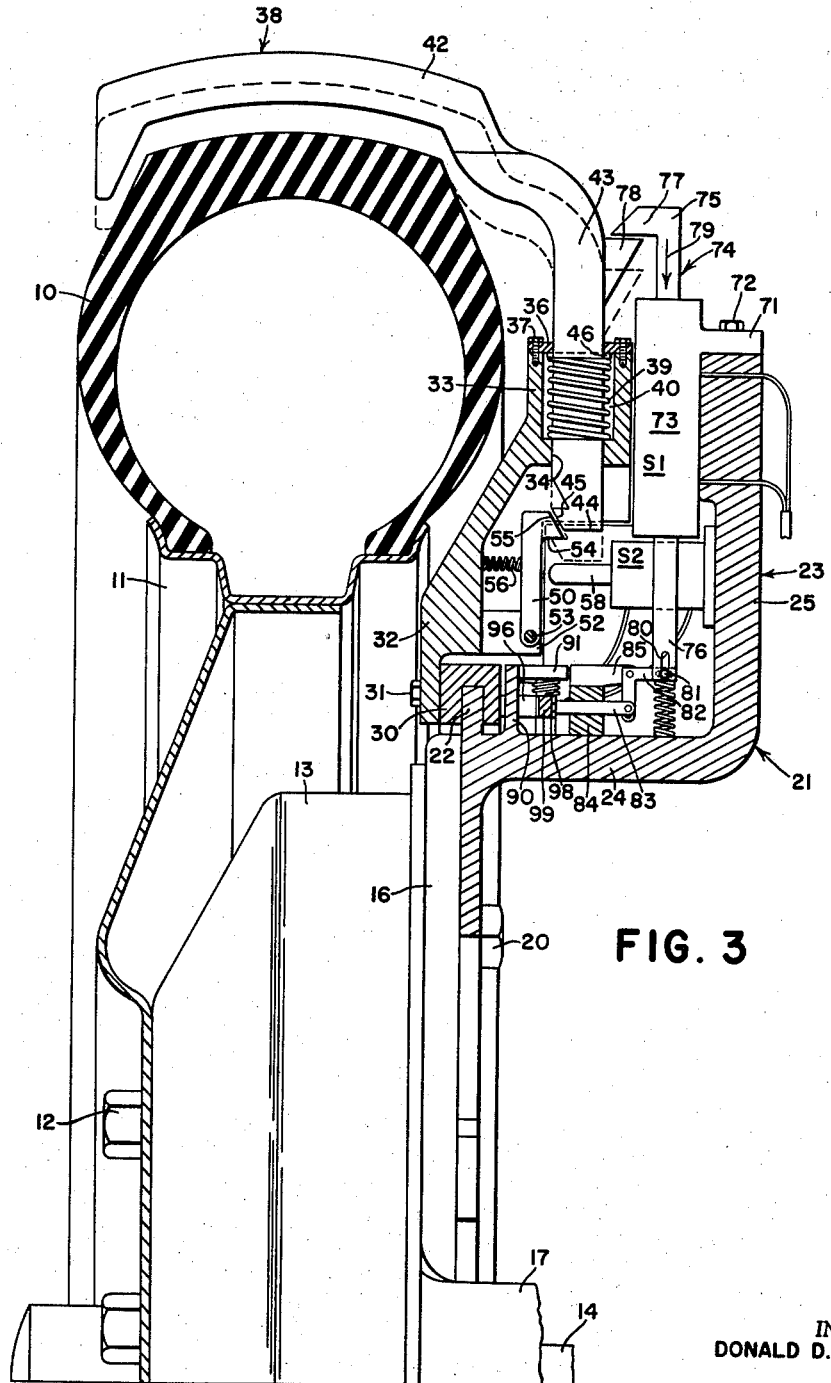
Fig. 3 is a sectional view taken substantially along the line 3—3 of Fig. 2.

Referring again to the push rod 83, its axial outer end is positioned to contact the leg 99 of the L-shaped locking element 93 and to drive the element 93 so as to unlock the wall 90 from the track 30. Viewing Fig. 3 in particular, it is apparent that as the primary solenoid S1 drives the shoe 38 into engagement with the tire 10, it will automatically effect movement of the locking element 93 so as to permit relative rotation between the track 30 and the guide 22.

Since the effect of the plunger 74 will be only instantaneous there must be provided an additional means for maintaining the locking element 93 in a disengaged position while the shoe 38 is in engagement with the tire. Also provided on the wall 90 is a pair of ear brackets 105, 106 which pivotally support one end of a link 107. The link 107 has a hooking lug 108 which engages the leg 99 of the element 93 to hold the locking element 93 in a disengaged position. The link 107 is controlled by a tertiary solenoid S3 which has its plunger 110 connected to the link 107. The solenoid S3 is supported on the support portion 24. The solenoid S3 when energized will draw the plunger 110 toward the solenoid, or in the direction indicated by the arrow 111, which will cause the link 107 to release the locking element 93. Surrounding the plunger 110 is a spring 112 which biases the link 107 toward engagement with the locking element 93.

Further supported on the wall 90 is a solenoid switch T2 which has a control rod 121 in contact with the leg 96 of the locking element 93. The switch T2 controls the current to the secondary solenoid S2 through wiring 122, 123. In operation, as the leg 96 moves into the slots 95, 97 and permits extension of the control rod 121 the switch T2 will be closed to permit the solenoid S2 to be energized.

Before going further, it should be recognized that only one locking element 93 is required for all three shoe assemblies and that while three locking elements and their corresponding control linkage would operate satisfactorily, from an economy standpoint only one would be recommended.

Figure 6:
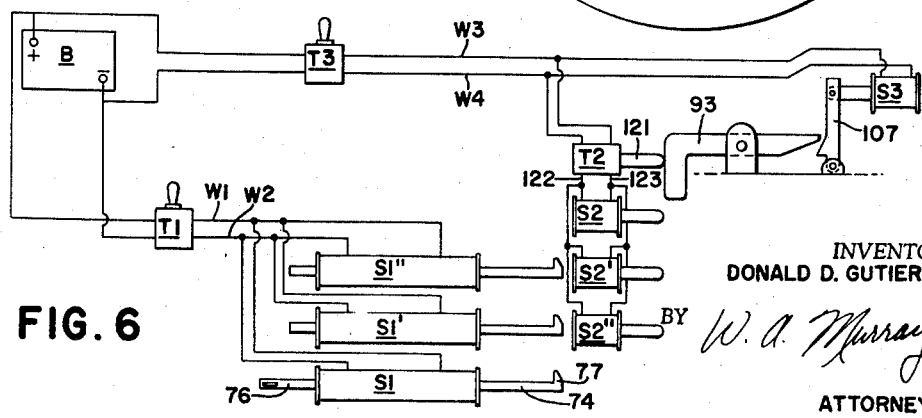
Fig. 6 is a schematic view of the electrical circuit of the assembly.

Referring now to Fig. 6, which shows the circuit, power is received from a main electrical system of the vehicle and specifically from a battery B. In a first circuit, current flows from the battery B through wiring W1, W2 and a primary switch T1 which when closed permits the primary solenoids S1, S1', S1" supported on the respective three angularly spaced supports 21 to be energized. The switch T1 from a practical standpoint would be placed on the dashboard of the automobile or vehicle.

In a second circuit, current flows through wiring W3, W4 and a switch T3, which may also be mounted on the dashboard, and which will when closed energize the tertiary solenoid S3. The solenoid S3 through the aforedescribed linkage 107, 93 will effect opening or closing of the switch T2 which when closed will cause the solenoids S2, S2', S2" supported on the respective angularly spaced supports 21 to energize through wiring 122, 123. In this respect it is anticipated that only one solenoid S3, its linkage 107, 93 and switch T2 will be required to operate all three solenoids S2, S2', S2".

The structure of the invention will operate in the following manner. Assume the shoes are in the secondary position or spaced from the periphery of the tire or torus member and the locking element 93 is seated in the slots 95, 97. In order to cause the shoes to engage the wheel, it is necessary to close the switch T1. This causes the solenoids S1, S1', S1" to drive the shoes 38 radially inwardly where they are locked in their first position by the hook end 54 of the lever 50 seating itself in the end 44 of the shank 43. At the same time the lower end 76 of the plunger 74 will cause movement, through the linkage 82, 83, of the locking element 93 out of the slots 95, 97 thereby permitting relative rotation between the track 22 and guides 30. Since the shoes 38 are in engagement with the tire 10, the shoes, their supports 32 and guides 30 will rotate.

When it is desired to again move the shoes spacedly from the tire 10, the switch T3 is closed, thereby energizing the tertiary solenoid S3 which will in turn release the locking element 93 to cause the leg portion 96 to first seat itself in the slot 95 and to ride against the surface of the track 30 until the slot 97 is in registry with the slot 95, whereupon the leg 96 will seat itself in that slot. Upon the latter occurring, the switch T2 will be closed, thereby energizing the solenoids S2, S2', S2". Upon the solenoids S2, S2', S2" being energized, their plungers 58 will drive the levers 50 from engagement with the shank portions 43 of the shoes, and springs 39 will cause the shoes 38 to move to their disengaged positions.

Therefore, while only one form of the invention has been shown, obviously other forms and variations will occur to those skilled in the art. It should therefore be understood that the particular form was shown and described in detail only for the purpose of clearly and concisely illustrating the principles of the invention, and it was not the intention to limit or narrow the invention beyond the broad concept set form in the appended claims.

What is claimed is:

1. An attachment for use with a wheel structure on a vehicle having an electrical power source, the wheel structure including an outer torus member formed about an axis and rotatably mounted relative to a non-rotatable frame, a radial structure fixedly attachable to the frame and having an annular guide radially inwardly of the outer periphery of the torus member; an annular track rotatably mounted relative to the guide; a shoe member having an axially extending shoe portion overlying the torus member and a radial portion extending inwardly alongside the torus member; means mounting the radial portion on the annular track for radial movement whereby the shoe portion may move between a first position engaging the torus member and a second position spacedly outward of the torus member; shoe locking means supported by the annular track automatically engageable with the radial portion for restricting radial movement from said first position; means biasing said shoe member to said second position; primary solenoid means mounted on the radial structure effectively associated with said shoe member for effecting movement of said shoe member from said first to said second position; primary circuit means including a manually operated switch extending from the electrical power source to the primary solenoid for energizing the latter; a locking element movably mounted on the radial structure and biased to a locking position to effect a locking connection between the radial structure and annular track for preventing rotation of the latter; means connecting said locking element to the primary solenoid to automatically effect movement of the element from said locking position upon the primary solenoid moving the shoe member into engagement with the torus member; a secondary solenoid effective to release the locking means on the shoe member; secondary circuit means including a secondary switch extending from the electrical power source to the secondary solenoid for energizing the latter; a tertiary solenoid effective to move the locking element into said locking position and to close said secondary switch to energize the secondary solenoid; and a switch means in the second circuit for energizing the tertiary solenoid.

2. An attachment for use with a wheel structure on a vehicle having an electrical power source, the wheel structure including an outer torus member formed about an axis and rotatably mounted relative to non-rotatable frame, a radial structure fixedly attachable to the frame and having an annular guide radially inwardly of the outer periphery of the torus member; an annular track rotatably mounted relative to the guide; a shoe member having an axially extending shoe portion overlying the torus member and a radial portion extending inwardly alongside the torus member; means mounting the radial portion on the annular track for radial movement whereby the shoe portion may move between a first position engaging the torus member and a second position spacedly outward of the torus member; shoe locking means supported by the annular track automatically engageable with the radial portion for restricting radial movement from said first position; means biasing said shoe member to said second position; means on the radial structure effectively associated with said shoe member for effecting movement of said shoe member from said first to said second position; track locking means mounted on the radial structure effecting a locking connection between the radial structure and annular track for preventing rotation of the latter, said track locking means being automatically released upon the shoe member moving into engagement with the torus member; a first solenoid effective to release the shoe locking means; circuit means including a solenoid switch extending from the electrical power source to the first solenoid for energizing the latter; a second solenoid effective to move the track locking means into locking position and to close said solenoid switch to energize the first solenoid; and a main switch means in the circuit for energizing the second solenoid.

3. An attachment for use with a wheel on a vehicle having an electrical power source, the wheel being rotatably mounted relative to a non-rotatable frame, a radial structure fixedly attachable to the frame and having an annular guide radially inwardly of the outer periphery of the wheel; an annular track rotatably mounted relative to the guide; a shoe member having an axially extending shoe portion overlying the periphery of the wheel and a radial portion extending inwardly alongside the wheel; means mounting the radial portion on the annular track for radial movement whereby the shoe portion may move between a first position engaging the periphery of the wheel and a second position spacedly outward of the wheel; shoe locking means supported by the track automatically engageable with the shoe member for restricting radial movement from said first position; means biasing said shoe member to said second position; means on the radial structure effectively associated with said shoe member for effecting movement of said shoe member from said first to said second position; track locking means mounted on the radial structure effecting a locking connection between the radial structure and annular track for preventing rotation of the latter, said track locking means being automatically released upon the shoe member moving into engagement with the wheel; a first solenoid effective to release the shoe locking means; circuit means including a solenoid switch extending from the electrical power source to the first solenoid for energizing the latter; a second solenoid effective to move the track locking means into locking position and to close said solenoid switch to energize the first solenoid; and a main switch means in the circuit for energizing the second solenoid.

4. An attachment for use with a wheel on a vehicle having an electrical power source, the wheel being rotatably mounted relative to a non-rotatable frame, a plurality of radial structures fixedly attachable to the frame, each having a segment of a continuous annular guide radially inwardly of the periphery of the wheel; an annular track rotatably mounted relative to the guide; a plurality of angularly spaced shoe members having axially extending shoe portions overlying the wheel and radial portions extending inwardly alongside the wheel; means effecting movement of the shoe portions between a first position engaging the wheel and a second position spacedly outward of the wheel; shoe locking means supported by the annular track automatically engageable with the radial portions for preventing radial movement from said first position; means biasing said shoe members to said second position; a locking element movably mounted on the radial structure and biased to a locking connection between the radial structure and annular track for preventing rotation of the latter; means automatically releasing the locking element to release said track for permitting relative rotation of the track on the guide in response to the shoe members moving into engagement with the wheel; a solenoid effective to release the shoe locking means; circuit means including a solenoid switch extending from the electrical power source to the solenoid for energizing the latter; a solenoid effective to move the locking element into engagement with the guide and to open said switch to energize the solenoid effecting the shoe locking means; and a switch means in the latter circuit for energizing the solenoid effecting movement of the locking element.

5. An attachment for use with a wheel on a vehicle having an electrical power source, the wheel being rotatably mounted relative to a non-rotatable frame, a radial structure fixedly attachable to the frame, including portions thereof defining a substantially continuous annular guide radially inwardly of the periphery of the wheel; an annular track rotatably mounted relative to the guide; a plurality of angularly spaced shoe members having axially extending shoe portions overlying the wheel and radial portions extending inwardly alongside the wheel; means effecting movement of the shoe portions between a first position engaging the wheel and a second position spacedly outward of the wheel; shoe locking means mounted on the annular track automatically engageable with the radial portions for preventing radial movement from said first position; means biasing said shoe members to said second position; track locking means supported on the main frame effecting a locking connection between the radial structure and annular track for preventing rotation of the latter; means automatically releasing the track locking means to release said track for permitting relative rotation of the track on the guide in response to the shoe members moving into engagement with the wheel; a solenoid effective to release the shoe locking means; circuit means including a solenoid switch extending from the electrical power source to the solenoid for energizing the latter; a solenoid effective in one action to move the track locking means into locking position, said latter solenoid being effective through the same action to open said switch to energize the solenoid effecting the shoe locking means; and a manual switch means for energizing the solenoid effecting action of the track locking means.

6. The invention defined in claim 5 further characterized by the track locking means having at least one latch element, the guide has a plurality of latch receiving notches angularly spaced substantially on the order of spacing of the shoe members, the track has a notch therein registrable with the notches in the guide and means effecting movement of said latch element into the notch in said track and in a notch in said guide when one of the latter notches is moved into registry with the former notch.

7. An attachment for use with a wheel on a vehicle having an electrical power source, the wheel being rotatably mounted relative to a non-rotatable frame, a radial structure fixedly attachable to the frame, including portions thereof defining a substantially continuous annular guide radially inwardly of the periphery of the wheel; an annular track rotatably mounted relative to the guide; a plurality of angularly spaced shoe members having axially extending shoe portions overlying the wheel and radial portions extending inwardly alongside the wheel; means effecting movement of the shoe portions between a first position engaging the wheel and a second position spacedly outward of the wheel; shoe locking means mounted on the annular track automatically engageable with the radial portions for preventing radial movement from said first position; means biasing said shoe members to said second position; track locking means supported on the main frame effecting a locking connection between the radial structure and annular track for preventing rotation of the latter; means automatically releasing the track locking means to release said track for permitting relative rotation of the track on the guide in response to the shoe members moving into engagement with the wheel; circuit means including a solenoid effective in one action to move the track locking means into locking position, said solenoid being effective through the same action to effect the shoe locking means to release each of said shoes to move to their second position; and a manual switch means for energizing the solenoid.

8. An attachment for use with a wheel on a vehicle having an electrical power source and a main frame, an annular structure fixedly attachable to the frame; an annular track rotatably mounted relative to the annular structure; a plurality of angularly spaced shoe members having axially extending shoe portions overlying the wheel and radial portions extending inwardly alongside the wheel; means mounting each of the radial portions on the annular track for radial movement whereby the shoe portions may move between a first position engaging the wheel and a second position spacedly outward of the wheel; primary solenoid means effecting movement of the shoes from said second to said first position; shoe locking means engageable with the shoes for preventing radial movement from said first position; circuit means including a manually operated switch extending from the electrical power source to the primary solenoid means for energizing the latter; track locking means adaptable to effect a locking connection between the annular structure and annular track; means connected to said primary solenoid means automatically releasing said track locking means upon the shoe members moving into engagement with the wheel; a secondary solenoid effective to release the shoe locking means; circuit means including a secondary solenoid switch extending from the electrical power source to the secondary solenoid for energizing the latter; a tertiary solenoid effective in one action to move the track locking means into locking connection and in the same action close said secondary switch to energize the secondary solenoid; and a manually controllable switch means in the second circuit for energizing the tertiary solenoid.

9. An attachment for use with a wheel on a vehicle having an electrical power source and a main frame, an annular structure fixedly attachable to the frame; an annular track rotatably mounted relative to the annular structure; a plurality of angularly spaced shoe members having axially extending shoe portions overlying the wheel and radial portions extending inwardly alongside the wheel; means mounting each of the radial portions on the annular track for radial movement whereby the shoe portions may move between a first position engaging the wheel and a second position spacedly outward of the wheel; primary solenoid means supported on the annular structure for effecting movement of the shoes from said second to said first position; shoe locking means engageable with the shoes for preventing radial movement from said first position; track locking means adaptable to effect a locking connection between the annular structure and annular track whereby said primary solenoids will be positioned to effect movement of shoe members; means connected to said primary solenoid means automatically releasing said track locking means upon the shoe members moving into engagement with the wheel; a secondary solenoid effective to release the shoe locking means; circuit means including a secondary solenoid switch extending from the electrical power source to the secondary solenoid for energizing the latter; a tertiary solenoid effective in one action to move the track locking means into locking connection and in the same action close said secondary switch to energize the secondary solenoid; and a manually controllable switch means in the second circuit for energizing the tertiary solenoid.

10. An attachment for use with a wheel on a vehicle having an electrical power source and a main frame, a radial structure fixedly attachable to the frame and disposed radially inwardly of the outer periphery of the wheel; an annular track rotatably mounted on the frame alongside the radial structure; a plurality of angularly spaced shoe members mounted on the track and having axially extending shoe portions overlying the wheel and radial portions extending inwardly alongside the wheel, said shoe members being mounted on the annular track for radial movement whereby the shoe portions may move between a first position engaging the wheel and a second position spacedly outward of the wheel; solenoid means energized by said power source mounted on the radial structure effecting movement of the shoe members between said first and said second positions; locking means mounted on the radial structure to effect a locking connection between the radial structure and annular track in a position whereby the solenoid means may effectively contact the shoe members; means connecting said locking means to the solenoid means to automatically release said connection upon the shoe members moving into engagement with the wheel; and a lock solenoid effective to move the locking means into said locking connection.

11. An attachment for use with a wheel on a vehicle having an electrical power source and a main frame, a radial structure fixedly attachable to the frame defining an outer annular guide radially inwardly of the outer periphery of the wheel; an annular track rotatably mounted relative to the guide; a plurality of angularly spaced shoe members mounted on the track and having axially extending shoe portions overlying the wheel, said shoe members being mounted on the annular track for radial movement whereby the shoe portions may move between a first position engaging the wheel and a second position spacedly outward of the wheel; solenoid means energized by said power source mounted on the radial structure effecting movement of the shoe between said first and said second positions; locking means mounted on the radial structure to effect a locking connection between the radial structure and annular track in relative angular positions whereby the solenoid means may effectively contact the shoe members; and a lock solenoid means effective to move the locking means into and out of said locking connection.

12. An attachment for use with a wheel on a vehicle having an electrical power source and a main frame, a radial structure fixedly attachable to the frame defining an outer annular guide radially inwardly of the outer periphery of the wheel; an annular track rotatably mounted relative to the guide, and having a plurality of angularly spaced lock receiving openings; a plurality of angularly spaced shoe members mounted on the track and having axially extending shoe portions overlying the wheel, said shoe members being mounted on the annular track for radial movement whereby the shoe portions may move between a first position engaging the wheel and a second position spacedly outward of the wheel; solenoid means energized by said power source mounted on the radial structure effecting movement of the shoe members between said first and said second positions; locking means including a latch element mounted on the radial structure, said latch element being adapted to seat in a lock receiving opening to effect a locking connection between the radial structure and annular track in relative angular positions whereby the solenoid means may effectively contact the shoe members; and a lock solenoid means effective to move the latch element into and out of said locking connection.

13. An attachment for use with a wheel on a vehicle having an electrical power source and a main frame, a radial structure rigidly united to the frame and having portions thereof defining an annular guide; an annular carrier ring rotatably supported relative to the guide and having radially extending supports angularly spaced about said ring; a plurality of angularly spaced shoe members having axially extending shoe portions overlying the wheel and carried on the supports for relative free radial movement whereby the shoe portions may move between a first position closely proximate the wheel and a second position spacedly outward of the wheel; primary electrical power means mounted on the radial structure effecting movement of the shoe members between said first and said second position; locking means movably mounted on the radial structure effecting a locking connection between the radial structure and ring for preventing rotation of the latter and for positioning said ring whereby said electrical power means will be disposed relative to the shoe members to effect movement of the shoe members between said first and second positions; and manual means for controlling said locking means to move into and out of said locking connection.

14. An attachment for use with a wheel on a vehicle having an electrical power source and a main frame, a radial structure rigidly united to the frame and having portions thereof defining an annular guide; an annular carrier ring rotatably supported relative to the guide and having radially extending supports angularly spaced about said ring; a plurality of angularly spaced shoe members having axially extending shoe portions overlying the wheel and carried on the supports for relative free radial movement whereby the shoe portions may move between a first position closely proximate the wheel and a second position spacedly outward of the wheel; primary electrical power means mounted on the radial structure effecting movement of the shoe members between said first and said second position; locking means movably mounted on the radial structure effecting a locking connection between the radial structure and ring for preventing rotation of the latter and for positioning said ring whereby said electrical power means will be disposed relative to the shoe members to effect movement of the shoe members between said first and second positions; structure extending between the locking means and the electrical power means to effect releasing of the locking connection upon the shoe members being moved to said first position; and manual means for controlling said locking means to move out of said locking connection.

References Cited in the file of this patent
UNITED STATES PATENTS

| | | |
|---|---|---|
| 1,787,608 | Ansell | Jan. 6, 1931 |
| 2,720,238 | McClelland | Oct. 11, 1955 |
| 2,770,280 | Fries et al. | Nov. 13, 1956 |